R. T. STOKES.

Windlass Water-Elevator.

No. 8,271. Reissued June 4, 1878.

Attest:

Colon C. Kennon

Chas. A. Pettit

Inventor:

Russell T. Stokes

By Munn & Co

Attorneys

PETERS, PHOTO-LITHOGRAPHER, WASHINGTON, D. C.

UNITED STATES PATENT OFFICE.

RUSSELL T. STOKES, OF GARNETT, KANSAS.

IMPROVEMENT IN WINDLASS WATER-ELEVATORS.

Specification forming part of Letters Patent No. 197,296, dated November 20, 1877; Reissue No. 8,271, dated June 4, 1878; application filed March 29, 1878.

*To all whom it may concern:*

Be it known that I, RUSSELL T. STOKES, of Garnett, in the county of Anderson and State of Kansas, have invented a new and Improved Water-Elevator; and I do hereby declare that the following is a full, clear, and exact description of the same.

This invention relates to means for raising water from wells, and is especially applicable to bucket-wheels with a center-discharge.

The nature of my invention consists in combining, with an endless chain of buckets, of circular or other form, a center-discharge wheel, which is constructed with inclined partitions, forming cells, that lead into spouts extending beyond the open side of the wheel, and so constructed and arranged that they will direct the streams of water into a chute or discharging-trough located beneath the wheel-shaft, as will be hereinafter explained.

Figure 1:
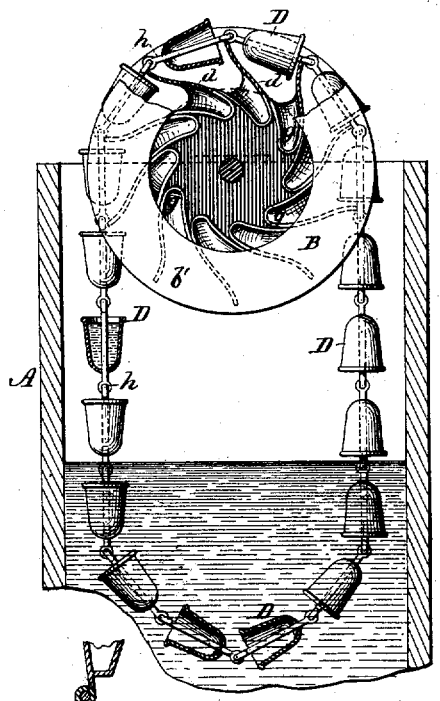
Figure 2:
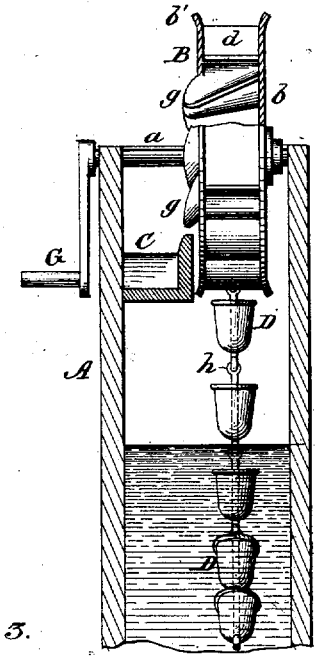
Figure 3:
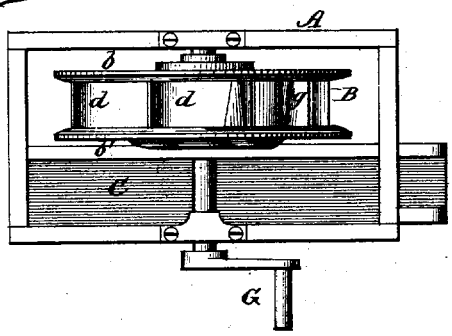
Figure 4:
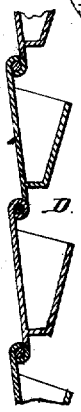

In the annexed drawing, Figure 1 is a section taken in a vertical plane through the bucket-wheel and several of the buckets of the chain. Fig. 2 is a vertical section taken transversely through the curb and discharge-trough, showing the edge of the wheel and chain of cup-shaped buckets. Fig. 3 is a top view of the elevator. Fig. 4 shows, in section, angular tapering buckets linked together.

Similar letters of reference indicate corresponding parts.

The letter A designates the curb of the well, on top of which the shaft *a* has its bearing in suitable boxes. On this shaft *a* the bucket-wheel B is keyed, being constructed with one side, *b*, closed, and the other side, *b'*, open—that is to say, the side *b'* is a ring concentric with the shaft *a*, the opening through which ring I term the "center-discharge opening," as all of the water elevated passes through this opening, and is received in an inclined trough or chute, C, arranged beneath it. Between the two side plates of the wheel are suitably secured, at regular intervals apart, inclined or curved partitions or guides *d*, which extend from points near the periphery of the wheel to the inner edge of the ring *b'*. The guides *d* conduct the inflowing water down into chutes or spouts *g*, which latter converge toward the axis of the wheel, and are continuations of the partitions or guides. The mouths or outer ends of the spouts *g* extend outward beyond the plane of the ring *b'*, so that there will not be any waste of water.

In combination with the wheel B, I employ an endless chain of lifting-buckets, D, which may be of the cup-shaped form represented in Figs. 1 and 2; or they may be of an angular tapering form, as shown in Fig. 4. The backs of the buckets of Fig. 4 are hinged together to form the endless chain; but the conical buckets are connected together by links *h*, as shown.

When the angular buckets are used, they should be arranged to present their lips toward the center of the wheel, so as to throw the water between the guides *d* into the chutes or spouts *g*.

The length of the buckets is such, with respect to the distance between the outer ends of the partitions, that during the rotation of the wheel they will successively be received in the spaces between the said partitions, and empty their contents into the laterally-discharging chutes.

The wheel may be rotated by a crank, G, or in any other suitable manner.

Having thus described my invention, what I claim as new is—

In combination with the lifting-buckets D, the center-discharge wheel B, constructed with inclined partitions *d* and laterally-discharging chutes or spouts *g*, arranged over a trough, C, substantially in the manner described.

RUSSELL T. STOKES.

Witnesses:
L. K. KIRK,
L. W. SPRADLIN.